United States Patent
Huang et al.

(10) Patent No.: US 8,339,929 B2
(45) Date of Patent: Dec. 25, 2012

(54) NETWORK APPARATUS FOR ELIMINATING INTERFERENCE BETWEEN TRANSPORT PORTS AND METHOD THEREOF

(75) Inventors: Liang-Wei Huang, Taipei (TW); Chih-Yung Shih, Taipei (TW); Shieh-Hsing Kuo, Taipei County (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 973 days.

(21) Appl. No.: 12/350,929

(22) Filed: Jan. 8, 2009

(65) Prior Publication Data

US 2009/0180409 A1    Jul. 16, 2009

(30) Foreign Application Priority Data

Jan. 10, 2008   (TW) ............................... 97101003 A

(51) Int. Cl.
   *H04J 1/12*   (2006.01)
(52) U.S. Cl. ...................................................... 370/201
(58) Field of Classification Search ................. 370/201, 370/210, 290; 375/222; 439/620.1, 676
   See application file for complete search history.

(56) References Cited

U.S. PATENT DOCUMENTS

| 7,002,897 | B2 | 2/2006 | Jones et al. | |
|---|---|---|---|---|
| 7,187,711 | B1* | 3/2007 | Kantschuk et al. | 375/222 |
| 2005/0088961 | A1* | 4/2005 | Tellado et al. | 370/210 |
| 2006/0181975 | A1* | 8/2006 | Padiy et al. | 369/44.32 |
| 2006/0182014 | A1* | 8/2006 | Lusky et al. | 370/201 |
| 2007/0053261 | A1* | 3/2007 | Frisson et al. | 369/47.28 |
| 2007/0263857 | A1* | 11/2007 | Sharon et al. | 379/416 |
| 2007/0293094 | A1* | 12/2007 | Aekins | 439/676 |
| 2009/0191758 | A1* | 7/2009 | Aekins | 439/620.01 |

FOREIGN PATENT DOCUMENTS

| EP | 1 467 498 A1 | 10/2004 |
|---|---|---|
| JP | 2002353866 | 12/2002 |
| JP | 2005020402 | 1/2005 |
| TW | 495766 | 7/2002 |
| TW | 574791 | 2/2004 |
| WO | 2004057598 A1 | 7/2004 |

* cited by examiner

*Primary Examiner* — Albert T Chou
(74) *Attorney, Agent, or Firm* — Winston Hsu; Scott Margo

(57) ABSTRACT

A network apparatus for eliminating interference between transport ports includes a plurality of transport ports and at least one alien NEXT canceller. The alien NEXT canceller is coupled to a designated transport port of the plurality of transport ports for eliminating NEXT interference from other transport ports of the plurality of transport ports. The alien NEXT canceller operates in a time domain or a frequency domain. In one exemplary embodiment, the network apparatus is a switch.

14 Claims, 7 Drawing Sheets

NETWORK APPARATUS FOR ELIMINATING INTERFERENCE BETWEEN TRANSPORT PORTS AND METHOD THEREOF

BACKGROUND OF THE INVENTION

1. Field of the Invention

The present invention relates to a network apparatus and related method, and more particularly, to a network apparatus and related method for eliminating interference between transport ports.

2. Description of the Prior Art

A full duplex Ethernet communication of a 1G base-T/10G base-T system is accomplished by four unshielded twisted pairs (UTP). Thus, a transport port can have a plurality of channels, such as four channels. For the most part, the transmitted signals of a channel, (i.e. an unshielded twisted pair), at its transmitter are interfered with by an Echo formed at its receiver, and the transmitted signals of the transmitter are also interfered with by near-end cross talk (NEXT) formed at the other receivers. When processing digital signals of the receivers, the interference must be eliminated. In general, a Least Mean Square (LMS) update FIR canceller can be adopted to eliminate interference in a time domain, or be transferred to a frequency domain to eliminate interference.

In the prior art, however, only the interference within the same transport port (such as the Echo and the NEXT) is considered to require elimination. In practice, a network apparatus, such as a switch, with a plurality of transport ports always encounters interference coming from other transport ports. For example, in order to reduce costs, a transformer of a multi-port switch puts two or four coils of transport ports into the same element. Due to the internal coils of the transformer influencing each other, the adjacent transport ports will interfere with each other to affect signal quality.

SUMMARY OF THE INVENTION

It is therefore one of the objectives of the claimed invention to provide a network apparatus for eliminating interference between transport ports by using alien NEXT cancellers, and to provide a related method for solving the abovementioned problems.

According to an exemplary embodiment of the present invention, a network apparatus for eliminating interference between transport ports is provided. The network apparatus includes a plurality of transport ports, and at least one alien near end crosstalk (NEXT) canceller coupled to a designated transport port of the plurality of transport ports. The alien NEXT canceller is used for eliminating the NEXT interference from other transport ports of the plurality of transport ports. The network apparatus further includes a sample rate converter (SRC) coupled to the alien NEXT canceller for performing a sample rate conversion on input signals transmitted from other transport ports of the plurality of transport ports to the alien NEXT canceller. The alien NEXT canceller operates in a time domain or a frequency domain. The network apparatus is a switch.

According to an exemplary embodiment of the present invention, a method for eliminating interference between transport ports is provided. The method includes providing a plurality of transport ports, and eliminating the NEXT interference from other transport ports except for a designated transport port of the plurality of transport ports. The method operates in a time domain or a frequency domain.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
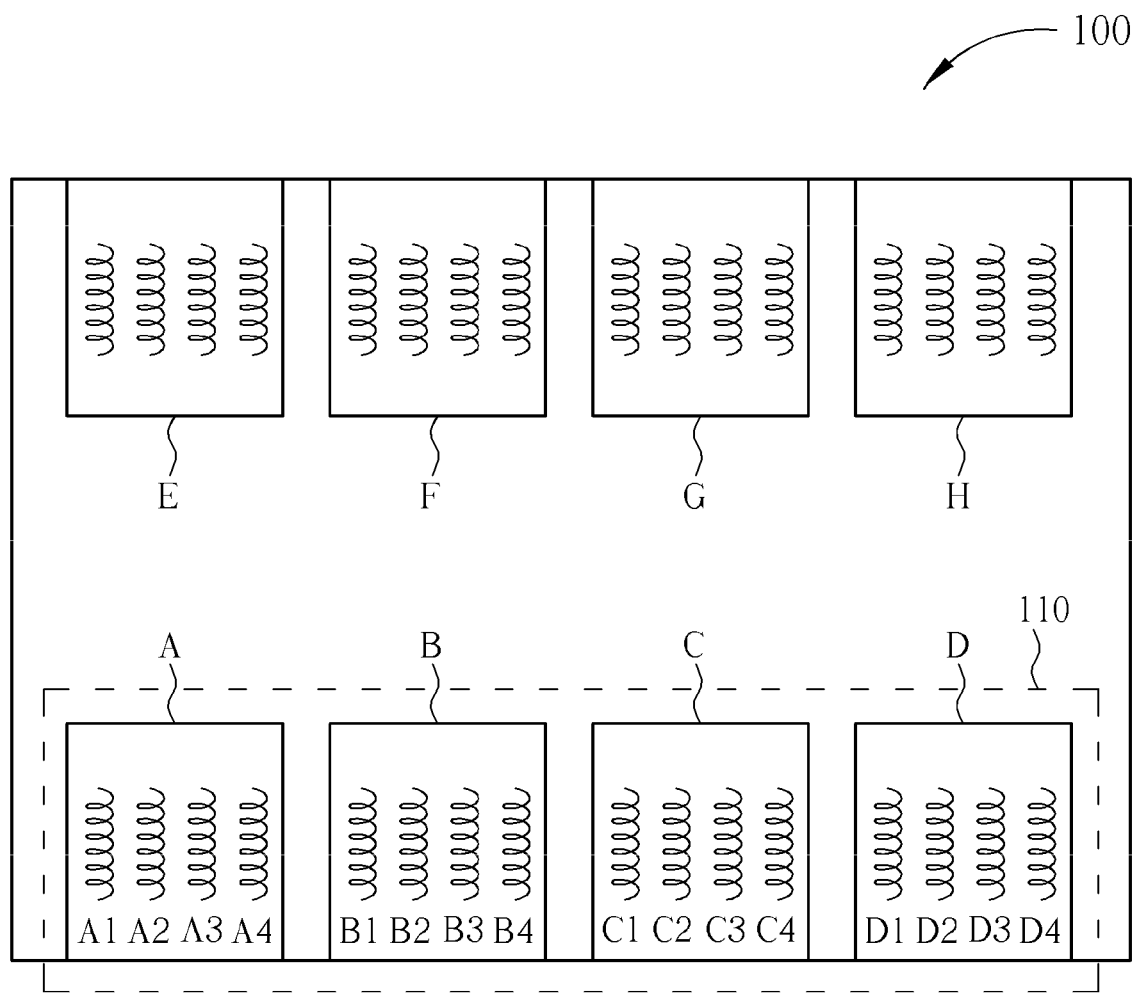
FIG. 1 is a diagram of a network apparatus for eliminating interference between transport ports according to an embodiment of the present invention.

Please refer to FIG. 1. FIG. 1 is a diagram of a network apparatus 100 for eliminating interference between transport ports according to an embodiment of the present invention. One embodiment of the network apparatus 100 is implemented by an eight-port switch. The network apparatus 100 includes eight transport ports A-H, wherein each of the transport ports A-H respectively has four channels and each of the channels is composed of a coil. For example, the transport port A includes four channels A1-A4, and the transport port B includes four channels B1-B4, and so forth. Usually, a transport port needs a transformer to filter DC voltages; however, some manufacturers put two or four coils of the transport ports in one element to save costs. As shown in FIG. 1, the coils of the transport ports A, B, C, and D are put in one transformer 110. Thus, the coils of the transport ports A, B, C, and D influence each other, which results in the adjacent transport ports interfering with each other and affecting signal quality.

Please note that the abovementioned network apparatus 100 can be implemented by a switch, but the scope of the invention is not limited to this embodiment and can be implemented by other network apparatuses. In addition, the number of the transport ports and the channels shown in FIG. 1 is merely an example, and should not be considered a limitation of the present invention. Please note that, the network apparatus 100 can be applied to a 10M/100M Base-T system, a 1G Base-T system, or a 10G Base-T system, but the scope of the invention is not limited to these embodiments and can be applied to other network systems.

If the signal decadency caused by adjacent transport ports inside the transformer 110 is very serious, the signal may be off. Hence, when eliminating the interference of a designated channel, besides the Echo from the designated channel and the NEXT from other channels of the same transport port, the alien NEXT resulting from other transport ports must be considered.

Figure 2:
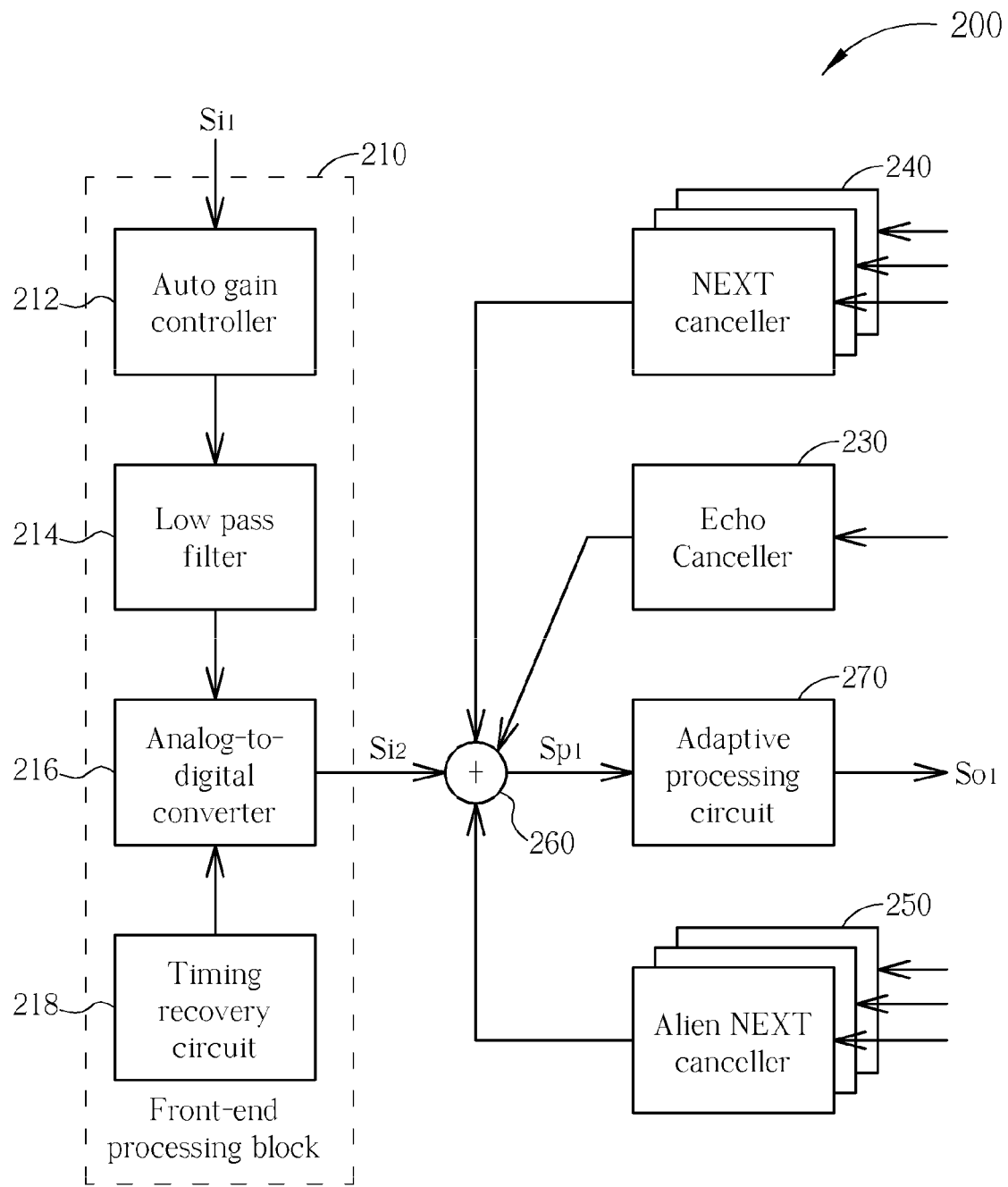
FIG. 2 is a block diagram of an example of a receiver corresponding to a designated channel within a designated transport port shown in FIG. 1.

Please refer to FIG. 2. FIG. 2 is a block diagram of an example of a receiver 200 corresponding to a designated channel within a designated transport port shown in FIG. 1. The receiver 200 includes, but is not limited to, a front-end processing block 210, an echo canceller 230, a plurality of NEXT cancellers 240, at least one alien NEXT canceller 250, an adder 260, and an adaptive processing circuit 270. The receiver 200 receives a first input signal $S_{i1}$. The first input signal $S_{i1}$ is then processed by the front-end processing block 210 to generate a second input signal $S_{i2}$. In this embodiment, the front-end processing block 210 includes an auto gain controller 212, a low pass filter 214, an analog-to-digital converter 216, and a timing recovery circuit 218. The auto gain controller 212 adjusts the gain of the first input signal $S_{i1}$. The low pass filter 214 filters high frequency noise. The analog-to-digital convert 216 performs an analog-to-digital conversion. And, the timing recovery circuit 218 recovers timing to generate the second input signal $S_{i2}$. Assume that the designated transport port is implemented by the transport port A shown in FIG. 1, and the designated channel is the channel A4. Thus, the echo canceller 230 receives the echo from the channel A4 itself, the plurality of NEXT cancellers 240 receives the NEXT coming from the other channels A1, A2, and A3 of the transport port A, and the alien NEXT canceller 250 receives the alien NEXT coming from the channels B1-B4, C1-C4, and D1-D4 of the other transport ports B, C, and D. In one embodiment, a total of one echo canceller 230, three NEXT cancellers 240, and twelve alien NEXT cancellers 250 are required.

The adder 260 is coupled between the analog-to-digital converter 216 of the front-end processing block 210 and the echo canceller 230, the plurality of NEXT cancellers 240, the alien NEXT canceller 250, and the adaptive processing circuit 270. The adder 260 is receives the second input signal $S_{i2}$ together with the signals inputted from the echo canceller 230, the plurality of NEXT cancellers 240, and the alien NEXT canceller 250, and performs an addition operation to generate a first processing signal $S_{P1}$. Finally, the adaptive processing circuit 270 performs an adaptive process on the first processing signal $S_{P1}$ to generate a first output signal $S_{O1}$. In one embodiment, the adaptive processing circuit 270 can include a feed forward equalizer (FFE), a digital auto gain controller (DAGC), a filter, and a feedback equalizer (FBE), but this is not a limitation of the present invention. Circuits with other functions can be added into or omitted from the adaptive processing circuit 270 depending on practical requirements.

Please note that the alien NEXT canceller 250 can operate in time domain or in frequency domain through conversions of mathematic equations. Those skilled in the art should know that this is not a limitation of the present invention.

Figure 3:
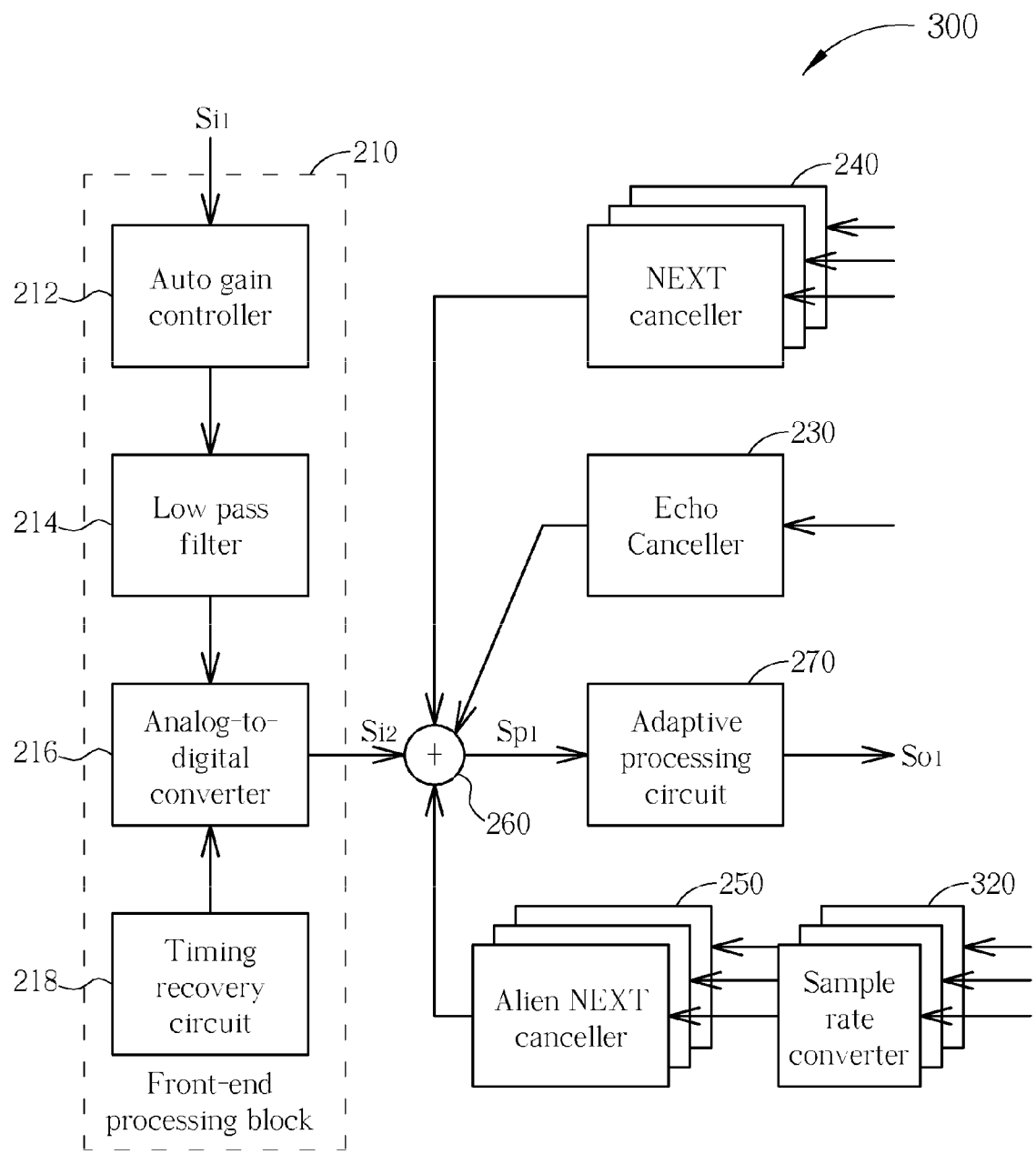
FIG. 3 is a block diagram of another example of a receiver corresponding to a designated channel within a designated transport port shown in FIG. 1.

The abovementioned architecture is suitable for an application of adjacent transport ports having an identical clock signal, but this is not a limitation of the present invention. It can also be applied to an application of adjacent transport ports having different clock signals. Please refer to FIG. 3, which is a block diagram of another example of a receiver 300 corresponding to the designated channel within the designated transport port shown in FIG. 1. The receiver 300 shown in FIG. 3 is similar to the receiver 200 shown in FIG. 2, the difference between them being that the receiver 300 further includes at least one sample rate converter (SRC) 320 coupled to the at least one alien NEXT canceller 250. The sample rate converter 320 performs a sample rate conversion on the input signals transmitted from other transport ports to the alien NEXT canceller 250. If the designated transport port is the transport port A shown in FIG. 1 and the designated channel is the channel A4, the alien NEXT canceller 250 is used for receiving the alien NEXT coming from the channels B1-B4, C1-C4, and D1-D4 of the other transport ports B, C, and D. If the clock signal of the transport ports B, C, and D is the same as the clock signal of the transport port A, the sample rate conversion will not be performed on the input signals inputted into the alien NEXT canceller 250 by the sample rate converter 320. If the clock signal of the transport ports B, C, and D is different from the clock signal of the transport port A, the sample rate conversion must be performed on the input signals inputted into the alien NEXT canceller 250 by the sample rate converter 320 before being provided for the NEXT canceller 250.

In order to save more costs and consider the alien NEXT resulting from other transport ports at the same time, the number of the alien NEXT canceller 250 can be adjusted depending on practical requirements. In the following description, some examples are taken for illustrating how to decide the number of the alien NEXT canceller 250. In a first example, only the alien NEXT resulting from adjacent transport ports needs to be considered. If the transport port A shown in FIG. 1 is the designated transport port and the channel A4 is the designated channel, the alien NEXT canceller 250 will receive the alien NEXT coming from the channels B1-B4 of the adjacent transport port B. In this condition, four alien NEXT cancellers 250 are needed in total. If the transport port B shown in FIG. 1 is the designated transport port and the channel B4 is the designated channel, the alien NEXT canceller 250 will receive the alien NEXT coming from the channels A1-A4 of the adjacent transport port A and the channels C1-C4 of the adjacent transport port C. In this condition, eight alien NEXT cancellers 250 are needed in total. If only the alien NEXT resulting from adjacent transport ports is considered, four (if the designated transport is the transport port A or D) or eight (if the designated transport is the transport port B or C) alien NEXT cancellers 250 are needed, which is fewer than the original twelve alien NEXT cancellers 250.

In a second example, only the alien NEXT resulting from the closest channel of the adjacent transport ports needs to be considered. If the transport port A shown in FIG. 1 is the designated transport port and the channel A4 is the designated channel, the alien NEXT canceller 250 will receive the alien NEXT coming from the closest channel B1 of the adjacent transport port B. In this condition, only one alien NEXT canceller 250 is needed. If the transport port B shown in FIG. 1 is the designated transport port and the channel B4 is the designated channel, the alien NEXT canceller 250 will receive the alien NEXT coming from the closest channel A4 of the adjacent transport port A and the closest channels C1 of the adjacent transport port C. In this condition, two alien NEXT cancellers 250 are needed in total.

If only the alien NEXT resulting from the closest channel of the adjacent transport ports is considered, only one (if the designated transport is the transport port A or D and the designated channel is the channel A1-A4 or D1-D4) or two (if the designated transport is the transport port B or C and the designated channel is the channel B1-B4 or C1-C4) alien NEXT cancellers 250 are needed, which is fewer than the previous four or eight alien NEXT cancellers 250.

Figure 4:
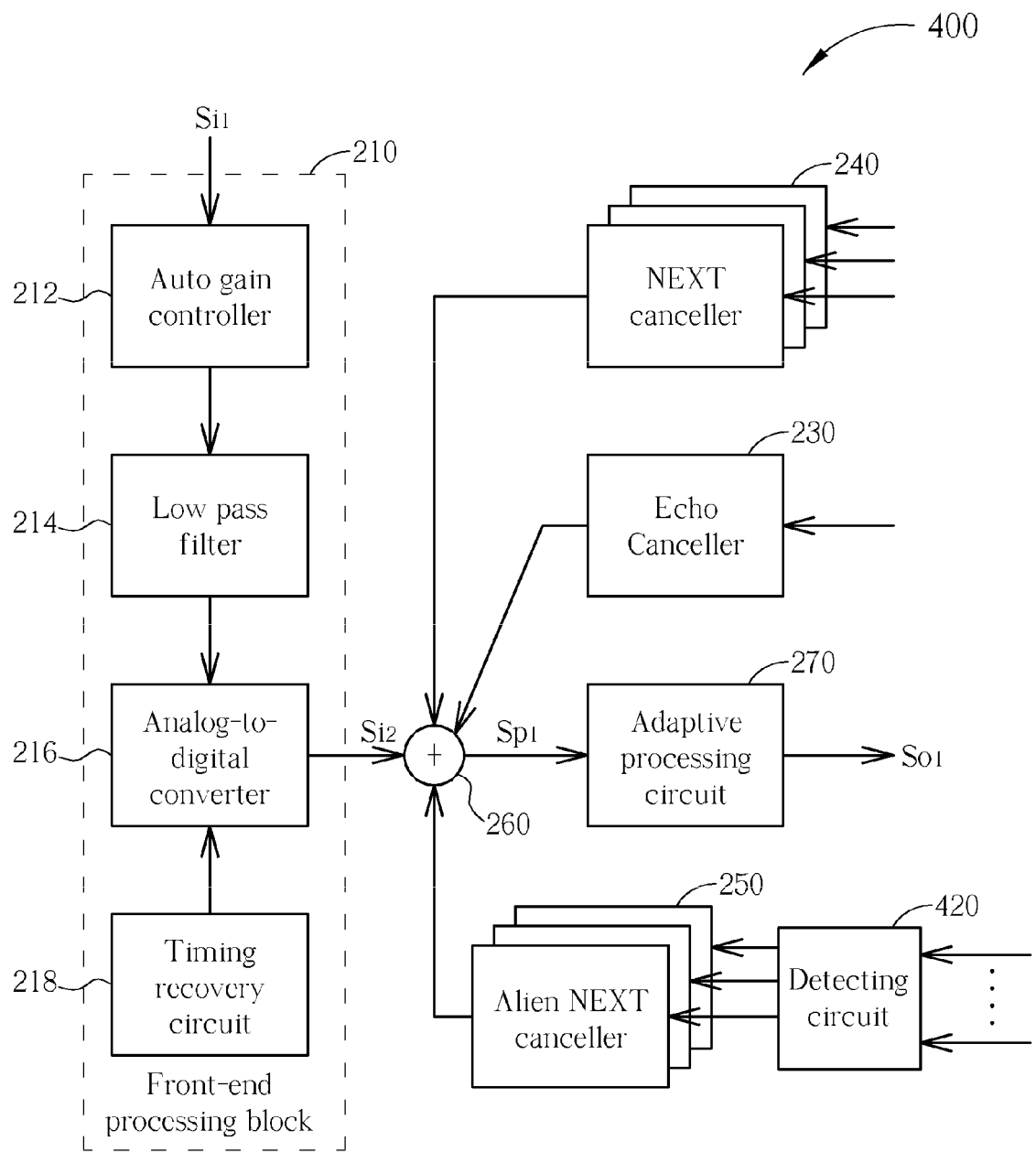
FIG. 4 is a block diagram of another example of a receiver corresponding to a designated channel within a designated transport port shown in FIG. 1.

In the second example above, if the channel that is the closest channel of the adjacent transport ports cannot be known directly, a detecting circuit is needed to solve the problem. Please refer to FIG. 4, which is a block diagram of another example of a receiver 400 corresponding to the designated channel within the designated transport port shown in FIG. 1. The receiver 400 shown in FIG. 4 is similar to the receiver 200 shown in FIG. 2, the difference between them being that the receiver 400 further includes a detecting circuit 420 coupled to each channel of other transport ports. The detecting circuit 420 is used for detecting a signal quality parameter of each channel and for determining signals of which channel of other transport ports is to be inputted to the alien NEXT canceller 250 according to the signal quality parameter of each channel. For example, if the transport port A shown in FIG. 1 is the designated transport port and the channel A4 is the designated channel, each channel B1-B4, C1-C4, and D1-D4 of the other transport ports B, C, and D are coupled to the detecting circuit 420 to detect the signal quality parameter (such as a signal-to-noise ratio, SNR) of each channel. If the SNR of the channel B1 is detected to be the largest, the detecting circuit 420 determines that the channel B1 is the closest to the designated channel A4 and decides to input the signals of the channel B1 into the alien NEXT canceller 250. For another example, if the transport port B shown in FIG. 1 is the designated transport port and the channel B4 is the designated channel, and each channel A1-A4, C1-C4, and D1-D4 of the other transport ports A, C, and D are coupled to the detecting circuit 420 to detect the signal quality parameter (such as a signal-to-noise ratio, SNR) of each channel. If the SNR of the channels A4 and C1 is detected to be the largest, the detecting circuit 420 determines that the channels A4 and C1 are closest to the designated channel B4 and decides to input the signals of the channels A4 and C1 into the alien NEXT canceller 250.

Please note that the abovementioned signal quality parameter can be SNR, but this should not be a limitation of the present invention and other signal quality parameters can be adopted.

These embodiments above are presented merely for describing applications of the present invention, and in no way should be considered to be limitations of the scope of the present invention. It will be obvious to those skilled in the art that various modifications for deciding the number of the alien NEXT canceller 250 may be made without departing from the spirit of the present invention. In addition, the sample rate converter 320 and the detecting circuit 420 are merely optional elements and can be omitted or replaced by other elements that can achieve the same goal.

Figure 5:
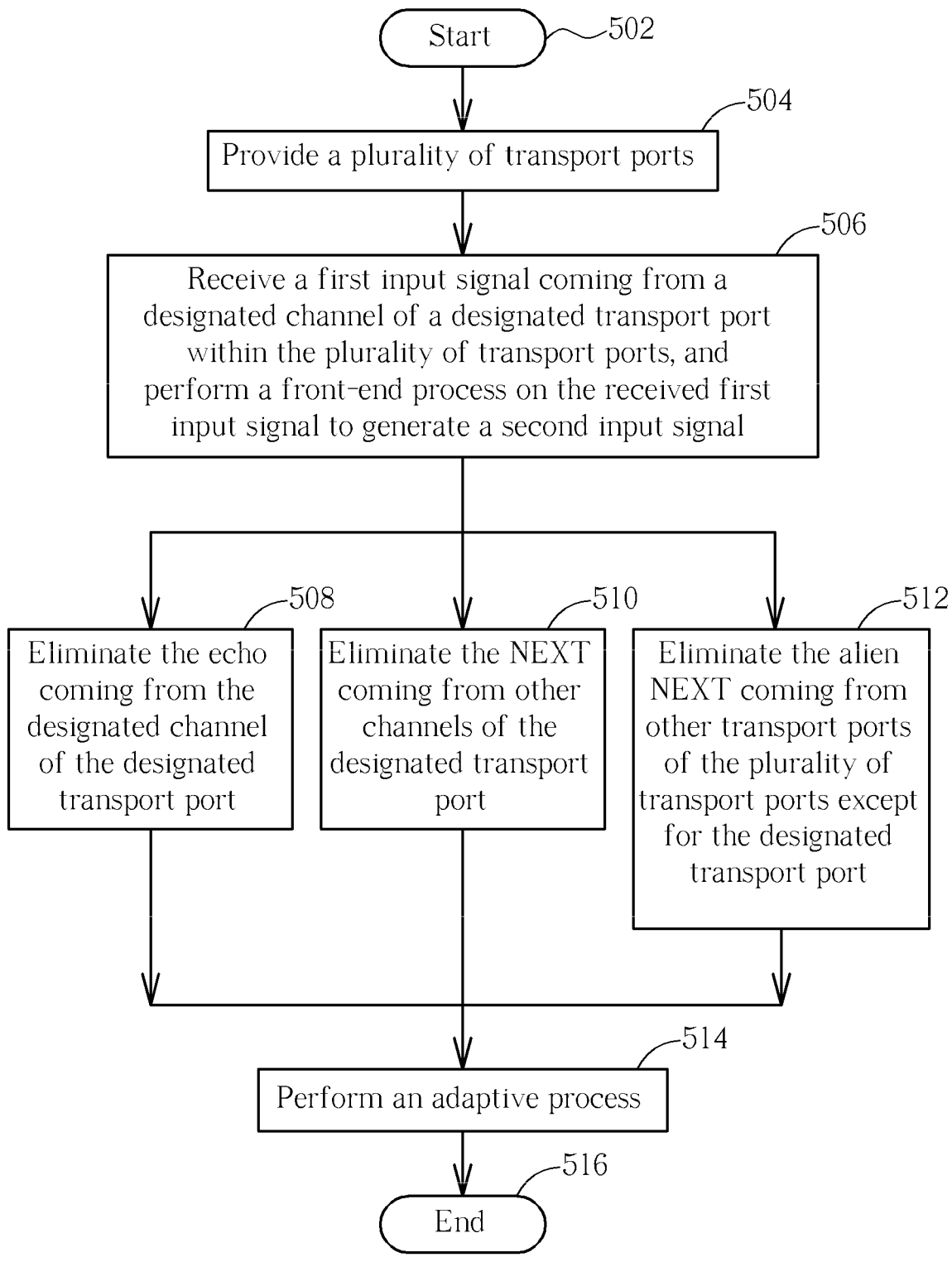
FIG. 5 is a flowchart illustrating a method for eliminating interference between transport ports according to an exemplary embodiment of the present invention.

Please refer to FIG. 5. FIG. 5 is a flowchart illustrating a method for eliminating interference between transport ports according to an exemplary embodiment of the present invention. Please note that the following steps are not limited to be performed according to the exact sequence shown in FIG. 5 if a roughly identical result can be obtained. The method includes the following steps:

Step 502: Start.
Step 504: Provide a plurality of transport ports.
Step 506: Receive a first input signal coming from a designated channel of a designated transport port within the plurality of transport ports, and perform a front-end process on the received first input signal to generate a second input signal.
Step 508: Eliminate the echo coming from the designated channel of the designated transport port;
Step 510: Eliminate the NEXT coming from other channels of the designated transport port.
Step 512: Eliminate the alien NEXT coming from other transport ports of the plurality of transport ports except for the designated transport port.
Step 514: Perform an adaptive process.
Step 516: End.

The following description details how each element operates by collocating the steps shown in FIG. 5 and the elements shown in FIG. 1 and FIG. 2. In Step 504, the plurality of transport ports A-H are provided. In Step 506, the first input signal $S_{i1}$ of a designated channel of a designated transport port is received by the front-end processing block 210 to perform a front-end process to generate the second input signal $S_{i2}$. Assume that the transport port A is the designated port and the channel A4 is the designated channel, thus in the steps 508-512, the adder 260 receives the second input signal $S_{i2}$ together with the echo from the designated channel A4 of the designated transport port A (the echo canceller 230), the NEXT from other channels (i.e., the channels A1, A2, and A3) within the designated transport port A (the NEXT cancellers 240), and the alien NEXT from other transport ports B, C, and D of the plurality of transport ports A-H except for the designated transport port A (the alien NEXT canceller 250) to perform an addition operation to eliminate the interference. In Step 514, the adaptive processing circuit 270 performs an adaptive process on the inference-eliminated signals to generate the first output signal $S_{O1}$.

Figure 6:
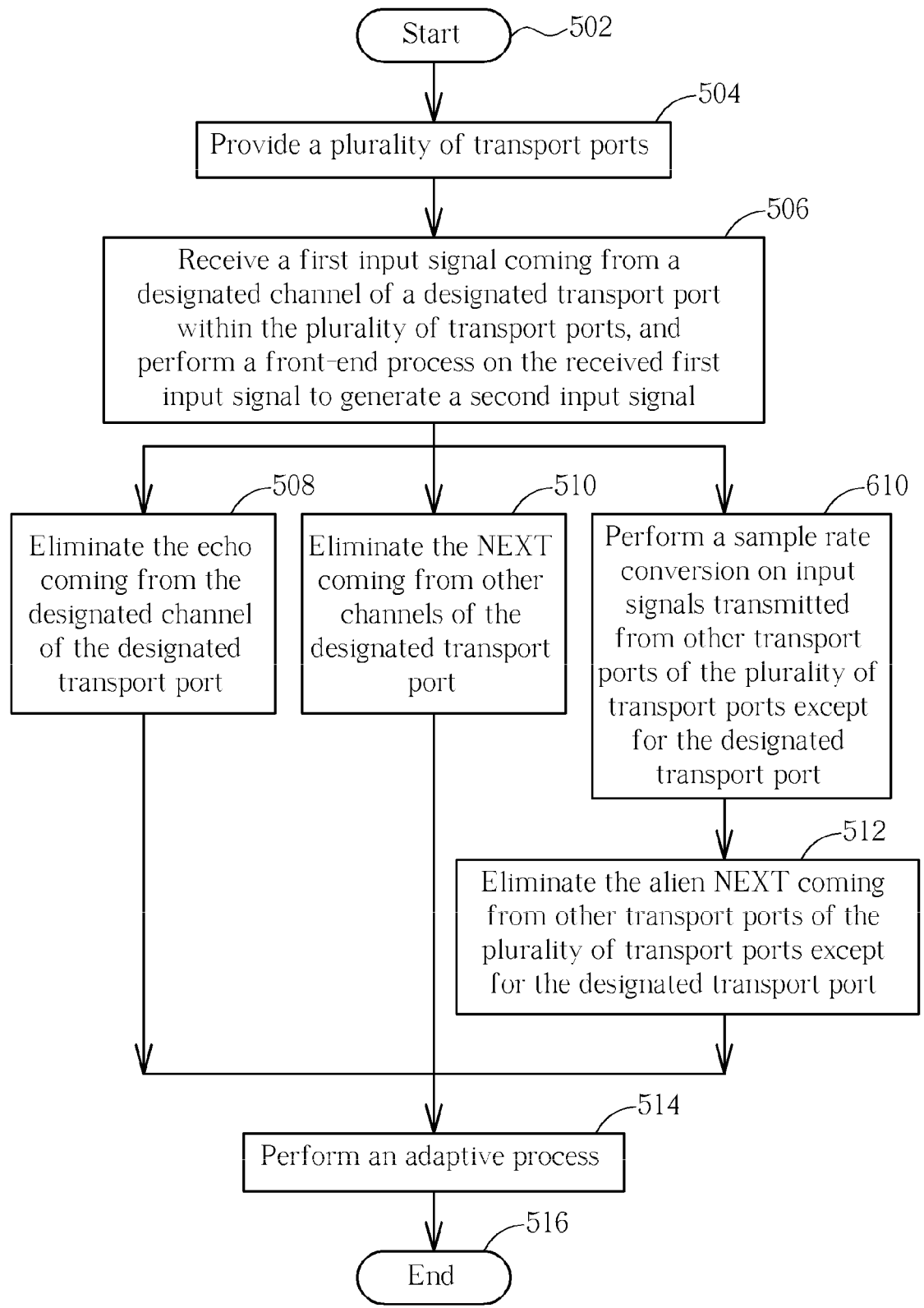
FIG. 6 is a flowchart illustrating a method for eliminating interference between transport ports according to another exemplary embodiment of the present invention.

Please refer to FIG. 6. FIG. 6 is a flowchart illustrating a method for eliminating interference between transport ports according to another exemplary embodiment of the present invention. Please note that the following steps are not limited to be performed according to the exact sequence shown in FIG. 6 if a roughly identical result can be obtained. The method includes the following steps:

Step 502: Start.
Step 504: Provide a plurality of transport ports.
Step 506: Receive a first input signal coming from a designated channel of a designated transport port within the plurality of transport ports, and perform a front-end process on the received first input signal to generate a second input signal.
Step 508: Eliminate the echo coming from the designated channel of the designated transport port.
Step 510: Eliminate the NEXT coming from other channels of the designated transport port.
Step 610: Perform a sample rate conversion on input signals transmitted from other transport ports of the plurality of transport ports except for the designated transport port.
Step 512: Eliminate the alien NEXT coming from other transport ports of the plurality of transport ports except for the designated transport port.
Step 514: Perform an adaptive process.
Step 516: End.

The steps shown in FIG. 6 are similar to the steps shown in FIG. 5, and is a variation of the embodiment shown in FIG. 5. The difference between them is that a sample rate converting step (i.e., Step 610) is added into the flowchart of FIG. 6. The operation of each element in the steps shown in FIG. 6 is referenced to that of the elements shown in FIG. 1 and FIG. 3. In Step 610, the sample rate converter 320 performs a sample rate conversion on the input signals transmitted from other transport ports (i.e., the transport ports B, C, and D) of the plurality of transport ports to the alien NEXT canceller 250. Due to the other steps shown in FIG. 6 being duplicates of the steps shown in FIG. 5, further description is omitted here for brevity.

Figure 7:
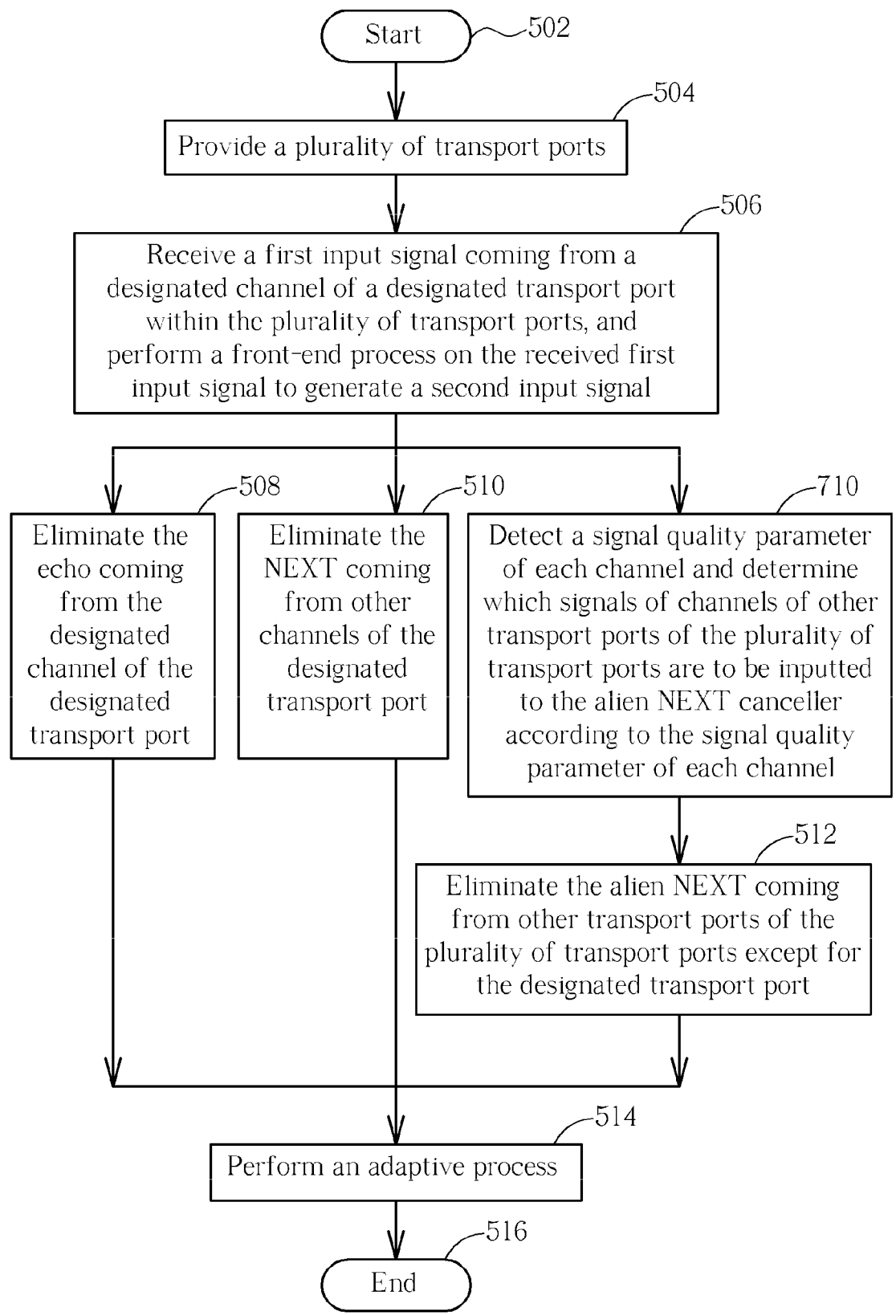
FIG. 7 is a flowchart illustrating a method for eliminating interference between transport ports according to another exemplary embodiment of the present invention.

Please refer to FIG. 7. FIG. 7 is a flowchart illustrating a method for eliminating interference between transport ports according to another exemplary embodiment of the present invention. Please note that the following steps are not limited to be performed according to the exact sequence shown in FIG. 7 if a roughly identical result can be obtained. The method includes the following steps:

Step 502: Start.
Step 504: Provide a plurality of transport ports.

Step 506: Receive a first input signal coming from a designated channel of a designated transport port within the plurality of transport ports, and perform a front-end process on the received first input signal to generate a second input signal.

Step 508: Eliminate the echo coming from the designated channel of the designated transport port.

Step 510: Eliminate the NEXT coming from other channels of the designated transport port.

Step 710: Detect a signal quality parameter of each channel and determine which signals of channels of other transport ports of the plurality of transport ports are to be inputted to the alien NEXT canceller according to the signal quality parameter of each channel.

Step 512: Eliminate the alien NEXT coming from other transport ports of the plurality of transport ports except for the designated transport port.

Step 514: Perform an adaptive process.

Step 516: End.

The steps shown in FIG. 7 are similar to the steps shown in FIG. 5, as FIG. 7 is a variation of the embodiment shown in FIG. 5. The difference between them is that a detecting step (i.e., Step 710) is added into the flowchart of FIG. 7. The operation of each element in the steps shown in FIG. 7 is referenced to that of the elements shown in FIG. 1 and FIG. 4. In Step 710, the detecting circuit 420 detects a signal quality parameter (such as an SNR) of each channel and determines which signals of channel of other transport ports (i.e., the transport ports B, C, and D) are to be inputted to the alien NEXT canceller 250 according to the signal quality parameter of each channel. Due to the other steps shown in FIG. 7 being duplicates of the steps shown in FIG. 5, further description is omitted here for brevity.

The abovementioned embodiments are presented merely for describing the present invention, and in no way should be considered to be limitations of the scope of the present invention. In summary, the abovementioned network apparatus 100 can be a switch, but is not limited to this embodiment and can be implemented by other network apparatuses. In addition, the number of the transport ports and the channels is merely an example for illustrating the present invention, and should not be considered as a limitation of the present invention. Furthermore, the network apparatus 100 can be applied to a 10M/100M Base-T system, a 1G Base-T system, or a 10G Base-T system, but is not limited to these embodiments and can be applied to other network systems. The abovementioned front-end processing block 210 and the adaptive processing circuit 270 are presented merely for describing the present invention, and in no way should be considered to be limitations of the scope of the present invention. Those skilled in the art should observe that various modifications of the front-end processing block 210 and the adaptive processing circuit 270 may be made. Please note that the alien NEXT canceller 250 can operate in time domain, or be transferred to frequency domain, and those skilled in the art should know that this should not considered as a limitation of the present invention. In addition, the architecture disclosed in the present invention is not only suitable for an application of adjacent transport ports having an identical clock signal but also can be applied to an application of adjacent transport ports having different clock signals by adding the sample rate converter 320 into the receiver 300. Moreover, the number of the alien NEXT canceller 250 can be adjusted depending on practical requirements. Those skilled in the art should observe that various modifications of the number of the alien NEXT canceller 320 may be made without departing from the spirit of the present invention. Please note that the sample rate converter 320 and the detecting circuit 420 are merely optional elements and can be omitted or replaced by other elements that can achieve the same goal. The signal quality parameter mentioned above can be an SNR, but this should not be a limitation of the present invention and other signal quality parameters can be adopted. Please also note that the steps are not limited to be performed according to the exact sequence shown in FIG. 5-FIG. 7, and those skilled in the art should observe that various modifications and alterations of the steps may be made without departing from the spirit of the present invention.

In summary, the present invention provides a network apparatus for eliminating interference between transport ports and related method. Through adding at least one alien NEXT canceller into the receiver of the network apparatus, the interference from other transport ports (i.e., the alien NEXT) can be eliminated to avoid signal decay resulting from adjacent transport ports and the problem of blowing off signals. In addition, through adding the sample rate converter, the concept of the present invention can be applied to adjacent transport ports having different clock signals. Moreover, in order to save more costs and consider the alien NEXT resulting from other transport ports at the same time, the number of the alien NEXT canceller 250 can be adjusted depending on practical requirements. If which channel that is the closest channel of the adjacent transport ports cannot be known directly, a detecting circuit can be added to solve the problem. Therefore, the network apparatus for eliminating the interference between transport ports disclosed in the present invention not only can eliminate the interference coming from the same transport port (the echo and the NEXT) but also can eliminate the interference coming from other transport ports (the alien NEXT) to avoid signal decay resulting from adjacent transport ports. Through several methods, the number of the alien NEXT cancellers can be reduced to further control costs.

Those skilled in the art will readily observe that numerous modifications and alterations of the device and method may be made while retaining the teachings of the invention.

What is claimed is:

1. A network apparatus for eliminating interference between transport ports, the network apparatus comprising:
    a plurality of transport ports;
    at least one alien near end crosstalk (NEXT) canceller, coupled to a designated transport port of the plurality of transport ports, for eliminating NEXT interference from other transport ports of the plurality of transport ports; and
    a sample rate converter (SRC), coupled to the alien NEXT canceller, for performing a sample rate conversion on input signals transmitted from other transport ports of the plurality of transport ports to the alien NEXT canceller.

2. The network apparatus of claim 1, wherein each of the plurality of transport ports comprises a plurality of channels, and the alien NEXT canceller is coupled to a designated channel of the designated transport port; and the network apparatus further comprises a detecting circuit coupled to each channel of other transport ports of the plurality of transport ports for detecting a signal quality parameter of each channel and for determining signals of which channel of other transport ports of the plurality of transport ports are to be inputted to the alien NEXT canceller according to the signal quality parameter of each channel.

3. The network apparatus of claim 2, wherein the signal quality parameter is a signal-to-noise ratio (SNR).

4. The network apparatus of claim 1, wherein the alien NEXT canceller operates in a time domain.

5. The network apparatus of claim 1, wherein the alien NEXT canceller operates in a frequency domain.

6. The network apparatus of claim 1, being applied to a 10M/100M Base-T system, a 1G Base-T system, or a 10G Base-T system.

7. The network apparatus of claim 1, being a switch.

8. A method for eliminating interference between transport ports, comprising:
provoding a plurality of transport ports;
eliminating NEXT interference from other transport ports except for a designated transport port of the plurality of transport ports; and
performing a sample rate conversion on input signals transmitted from other transport ports except for the designated transport port of the plurality of transport ports.

9. The method of claim 8, wherein each of the plurality of transport ports comprises a plurality of channels, and the method further comprises:
detecting a signal quality parameter of each channel and determining interference of which channels of other transport ports of the plurality of transport ports is to be eliminated according to the signal quality parameter of each channel.

10. The method of claim 9, wherein the signal quality parameter is a signal-to-noise ratio (SNR).

11. The method of claim 8, being operated in a time domain.

12. The method of claim 8, being operated in a frequency domain.

13. A network apparatus for eliminating interference between transport ports, the network apparatus comprising:
a plurality of transport ports; and
at least one alien near end crosstalk (NEXT) canceller, coupled to a designated transport port of the plurality of transport ports, for eliminating NEXT interference from other transport ports of the plurality of transport ports;
wherein each of the plurality of transport ports comprises a plurality of channels, and the alien NEXT canceller is coupled to a designated channel of the designated transport port; and the network apparatus further comprises a detecting circuit coupled to each channel of other transport ports of the plurality of transport ports for detecting a signal quality parameter of each channel and for determining signals of which channel of other transport ports of the plurality of transport ports are to be inputted to the alien NEXT canceller according to the signal quality parameter of each channel.

14. A method for eliminating interference between transport ports, comprising:
providing a plurality of transport ports, wherein each of the plurality of transport ports comprises a plurality of channels;
eliminating NEXT interference from other transport ports except for a designated transport port of the plurality of transport ports; and
detecting a signal quality parameter of each channel and determining interference of which channels of other transport ports of the plurality of transport ports is to be eliminated according to the signal quality parameter of each channel.

* * * * *